United States Patent [19]

Fokker

[11] 4,168,632
[45] Sep. 25, 1979

[54] VARIABLE ANGLE SWASHPLATE DRIVE

[75] Inventor: Herman Fokker, Eindhoven, Netherlands

[73] Assignee: U.S. Philips Corporation, New York, N.Y.

[21] Appl. No.: 808,045

[22] Filed: Jun. 20, 1977

[30] Foreign Application Priority Data

Jul. 28, 1976 [NL] Netherlands ............... 7608350

[51] Int. Cl.² ............... F16H 23/00; F01B 13/04
[52] U.S. Cl. ......................... 74/60; 91/505; 123/48 R
[58] Field of Search ............ 74/42, 60; 91/505, 506; 123/48 R, 58 R, 58 A, 58 B; 417/222

[56] References Cited

U.S. PATENT DOCUMENTS

| | | | |
|---|---|---|---|
| 2,940,325 | 6/1960 | Nakesch | 74/60 |
| 3,319,874 | 5/1967 | Welsh et al. | 74/60 |
| 3,356,080 | 12/1967 | Howard | 74/60 |
| 3,398,699 | 8/1968 | Stark | 74/60 |
| 3,859,861 | 1/1975 | Buschi | 74/42 |
| 3,964,323 | 6/1976 | Seibert | 74/60 |
| 3,968,699 | 7/1976 | Beukering | 74/60 |
| 4,030,404 | 6/1977 | Meijer | 92/12.2 |

Primary Examiner—Lawrence J. Staab
Attorney, Agent, or Firm—David R. Treacy

[57] ABSTRACT

A swashplate drive in which the plate is tiltable between a minimum angle $\check{a}$ and a maximum angle $\hat{a}$ and one or more drive rods each have a drive rod head with two spherical surfaces which are contacted by two sliding bodies, the other, flat side of the bodies engaging two running surfaces on the plate. The running surfaces are spaced apart a selected distance which minimizes variation in play between the plate, sliding bodies and drive rod head.

4 Claims, 9 Drawing Figures

VARIABLE ANGLE SWASHPLATE DRIVE

BACKGROUND OF THE INVENTION

The invention relates to a swashplate drive, comprising a shaft rotatably journalled in a frame and carrying a plate which cooperates with one or more drive rods, each of which has a drive rod head having two spherical recess surfaces which are contacted by the spherical surface of two sliding bodies, the other, flat side of the bodies cooperating with two running surfaces on the plate, each of the running surfaces on the plate being formed by a set of straight lines, each of which extends at least substantially in a radial plane through the axis of the shaft and is tangent at each running surface to an associated torus, the center lines of the two tori being formed by two ellipses which are situated one above the other in parallel planes.

A drive of the described kind is known from Netherlands patent application No. 7,308,702 laid open to public inspection to which U.S. Pat. No. 3,968,699 corresponds. The plate in this known drive is rigidly connected to the shaft in the direction of rotation as well as in the tilting direction.

As a result of the described construction of the plate, it is achieved that the play between the plate, the sliding bodies and the recess surface is constant over the entire circumference. However, this is true for only one position of the plate relative to the shaft.

Swashplate drives are known in which the plate is tiltable relative to the shaft; see, for example, the Netherlands patent application No. 7,410,532 laid open to public inspection to which U.S. Pat. No. 4,030,404 corresponds. The stroke of the pistons connected to the piston rods in this drive can be changed by tilting of the plate. The sliding bodies in this known drive have a slightly arched surface and extend over flat, parallel running surfaces on both sides of the plate, the centers of the recesses in which the sliding bodies are accommodated being coincident. It is thus possible to keep the play between the plate, the sliding bodies and the recesses constant over the entire circumference of the plate and for all positions of the plate relative to the shaft.

However, this drive has a drawback in that the arched surfaces of the sliding bodies are subject to substantial wear, so that in this case, involving a tiltable plate, line contact between plate and sliding bodies is desirable, without introduction of excessive play variations.

SUMMARY OF THE INVENTION

The invention has for its object to provide a swashplate drive having a tiltable plate with line contact between the running surfaces and the sliding bodies, the play variations therein remaining within acceptable limits over the entire circumference and for all positions which can be occupied by the plate relative to the shaft.

In a drive in accordance with the invention having means for varying, by tilting the plate, the angle enclosed by the plate and a plane perpendicular to the shaft, between a minimum angle $\check{\alpha}$ and a maximum angle $\hat{\alpha}$, in a position of the plate in which the two parallel planes enclose an angle with a plane perpendicular to the shaft equal to $$\sqrt{\check{\alpha}^2 + \hat{\alpha}^2/2},$$

the ellipses are formed by the lines of intersection of the relevant planes and a cylinder around the center line of the shaft and extending through the centers of curvature of the spherical surfaces on the drive rod heads, the distance between these centers of curvatures for each of the drive rods heads being equal to $$d = \frac{R}{2} \sin 2\beta \left( \frac{1}{\cos \check{\alpha}} + \frac{1}{\cos \hat{\alpha}} - 1 \right),$$

in which:
- R = the distance between the centers of curvature of the spherical surfaces and the center line of the shaft,
- β = the angle enclosed by the straight lines, forming the running surfaces, and the central plane of the plate
- $\hat{\alpha}$ and $\check{\alpha}$ are the maximum and the minimum angle respectively, which can be enclosed by the plate and a plane perpendicular to the shaft.

As a result of the described steps, the variation of the play in a drive in accordance with the invention is reduced to a permissible low value.

The invention is based on the recognition of the fact that when a plate having an arched surface is tilted, the play between the plate, the sliding bodies and the spherical drive rod surfaces varies because in the extreme positions (of the drive rods) the plate surface rotates between the sliding bodies about an axis parallel to the tilting axis and further translates in the radial direction, while in the central positions (of the drive rods) the plate between the sliding bodies rotates only about the tilting axis. In the case of a zero distance between the planes in which the ellipses are situated, a large play variation occurs in the extreme positions, while the play variation in the central positions is zero.

By selection of a given distance between the planes of the ellipses, it has been found that as a result of the rotation and translation described above a decrease of the play variation occurs in the extreme positions, while as a result of the rotation an increase of the play variation is obtained in the central positions. The sum of the play increase and decrease has been found to be approximately constant. Small play variations can be achieved by equalizing the play variations in the extreme positions and in the central positions and by making these clearance variations occur for half the value in the minimum tilted position of the plate and for the other half in the maximum tilted position of the plate.

The invention will be described in detail hereinafter with reference to the drawing.

Figure 1:
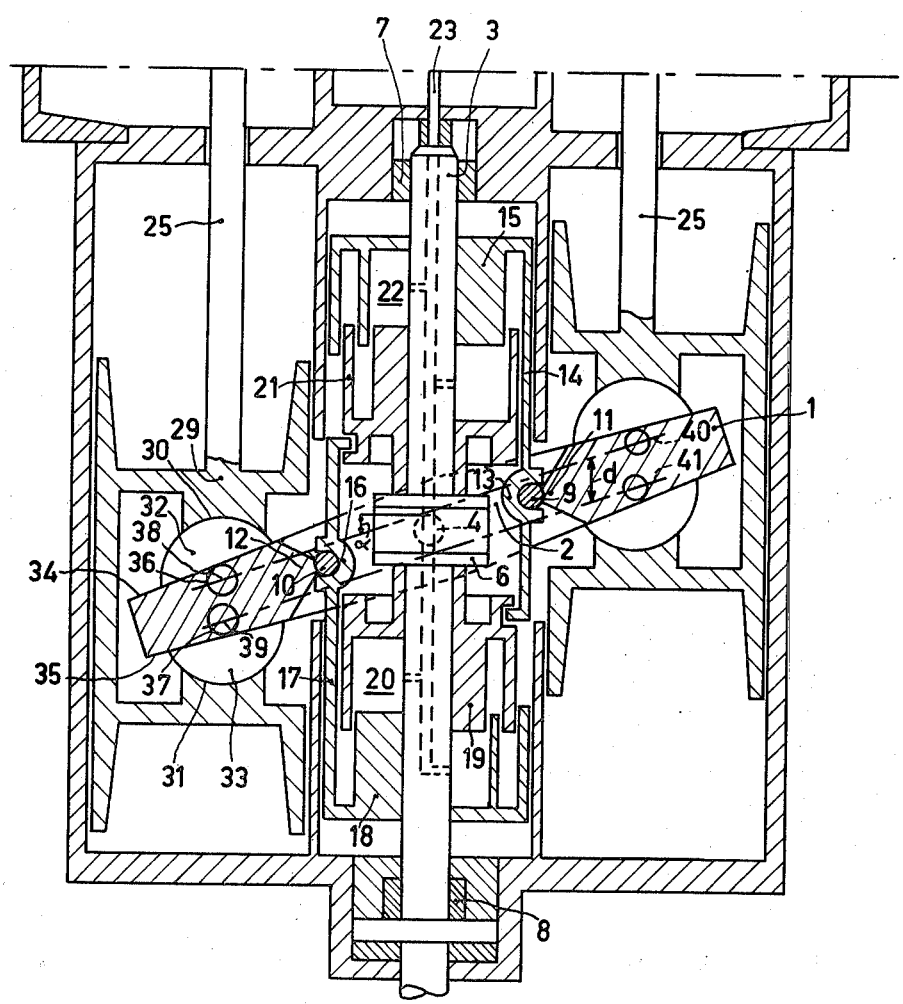
FIGS. 1 and 2 are diagrammatic axial sectional and cross sectional views respectively of a swashplate drive according to the invention, FIGS. 3 and 4a diagrammatically show given parts of the plate in different positions.
Figure 2:
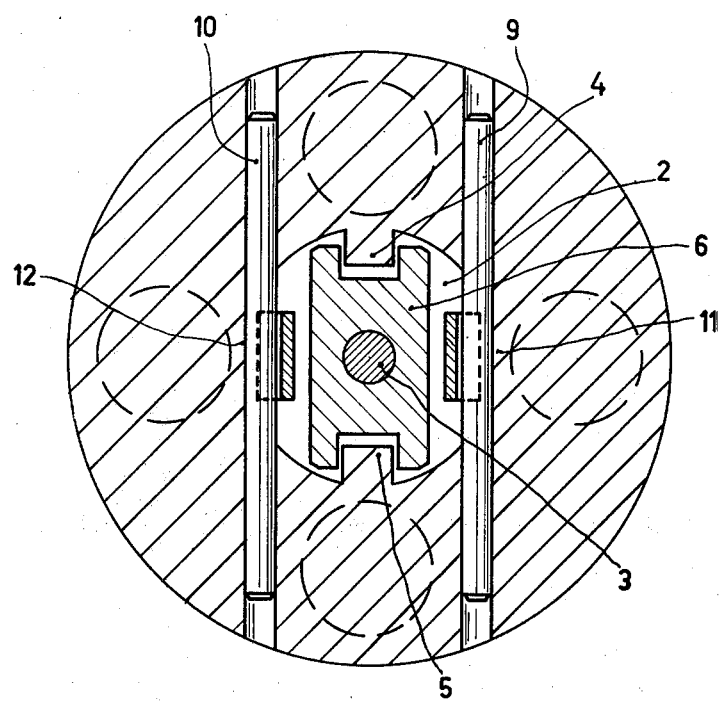

The drive shown in FIG. 1 comprises a plate 1 which is provided with a hole 2 in its center. The plate 1 is arranged around a shaft 3 and is journalled, by means of two cylindrical studs 4 and 5, in a block 6 which is rigidly connected to the shaft 3. Thus, the plate cannot rotate around the axis of the shaft 3 but is tiltable about the center line of the studs 4 and 5. The shaft 3 is journalled in the housing at the areas 7 and 8.

The plate 1 furthermore comprises two pins 9 and 10 which are arranged in a bore in the plate and which are freely suspended at the area of the hole 2 and are supported on one side by a portion 11 and 12, respectively, of the plate.

The pin 9 is journalled on the other side in a recess 13 of a portion 14 of a piston 15 which is slidable over the shaft 3. The pin 10 is similarly journalled in a recess 16 of a portion 17 of a piston 18 which is slidable over the shaft 3 and which is situated to the opposite side of the plate 1 from the piston 15.

The pistons 15 and 18 are constructed so that their centers of gravity are situated adjacent the center line of the shaft 3, that is, at the same side as the coupling 13, 14, 9 and 16, 17, 10, respectively, of the corresponding piston to the plate 1.

Instead of the described pin/slot coupling between the pistons and the plate, use can also be made, for example, of a coupling comprising two gearwheel segments or a gearwheel segment and a rack segment.

The portion 14 of the piston 15 is furthermore connected to a piston 19 which is slidably arranged on the shaft 3 on the same side of the plate 1 as the piston 18.

The pistons 18 and 19 are constructed so that the facing sides thereof can slide one into the other so that they bound a space 20 of variable volume.

The piston 19 is constructed so that its center of gravity is situated in the same plane through the center line of the shaft 3 as the center of gravity of the piston 15, their combined center of gravity being situated in the central plane of the plate 1.

Similarly, the portion 17 of the piston 18 is connected to a piston 21 which is situated on the same side of the plate 1 as the piston 15. A space 22 of variable volume is present between the pistons 15 and 21. Furthermore, the masses and the location of the pistons 18 and 21 are again chosen so that their combined center of gravity is again situated in the central plane of the plate 1, on the side of the tilting shaft 4 other than that where the center of gravity of the combination of the pistons 15 and 19 is situated.

Pressurized liquid can be applied to the spaces 20 and 22, through a duct 23 in the shaft 3, by means of a pumping device which is not shown in the drawing.

Four drive rods 25 cooperate with the plate 1, each drive rod being provided with a drive rod head 29 with two spherical or bowl-shaped recesses 30 and 31 in which sliding bodies 32 and 33 are journalled. The flat sides of these sliding bodies cooperate with respective running surfaces 34 and 35 on the plate 1. The other end of the piston rods is connected to pistons of, for example, a pump, a compressor or an engine.

The movement of the pistons is converted, through the drive rods, etc., and the plate 1, into a rotary movement of the shaft 3. The stroke of the pistons and the drive rods is determined by the angle $\alpha$ enclosed by the plane 1 and a plane perpendicular to the shaft 3. Thus, the piston stroke can be varied by variation of this angle.

In the device shown in the drawing, the angle is varied by supplying or extracting liquid, via the duct 23, to or from the spaces 20 and 22. The plate 1 is thus tilted.

In order to achieve suitable hydrodynamic lubrication between the sliding bodies 32 and 33 and the running surfaces 34 and 35 on the plate 1, the construction of the plate is double-conical. Each of the running surfaces 34 and 35 is constructed as a conical surface, the describing lines of which are tangent to a torus 36 and 37, respectively, of constant diameter around a center line 38 and 39, respectively, each of which center lines is formed by an ellipse situated in parallel planes 40 and 41, respectively, which enclose an angle $\alpha$ with the horizontal. The planes 40 and 41 extend in parallel and are situated at an axial distance d from each other.

The plate 1 may be tilted between two extreme positions in which the angle $\check{\alpha}$ has a minimum value $\check{\alpha}$ and a maximum value $\hat{\alpha}$, respectively It will be understood that a given play h exists between the plate 1, the sliding bodies 32 and 33 and the bowl-shaped recesses 30 and 31. For a given angle $\alpha$, with the construction of the plate 1 as described this angle may be constant for a complete revolution of the plate. However, if the angle $\alpha$ is varied by tilting of the plate 1, the play will also vary. On the basis of a plate which has a constant play for $\alpha=0$, this play may have increased by 60% at $\alpha=22°$, which is unacceptable.

Figure 4A:
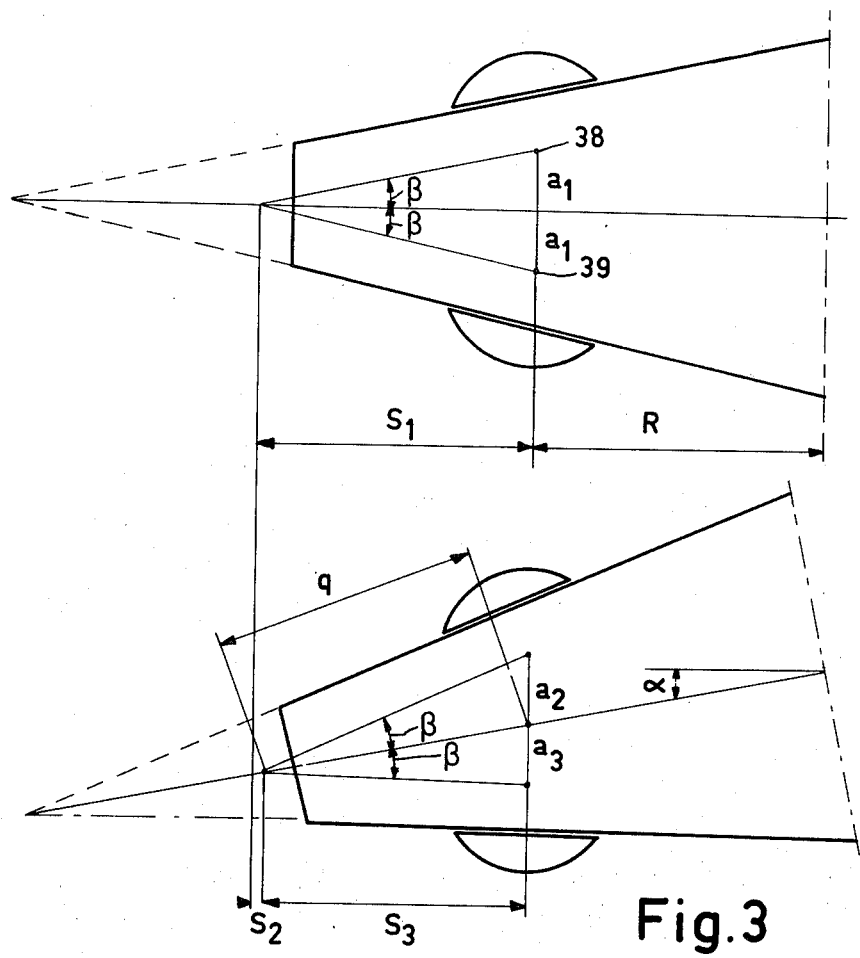
FIG. 4b is a graph of the variation of the play in the extreme and central positions as a function of the separation of the planes, FIGS. 5, 6 and 7 diagrammatically show the variation of the play in different circumstances for a plate which is tiltable between $\check{\alpha} = 0$ and $\hat{\alpha} = 22°$.
Figure 4B:
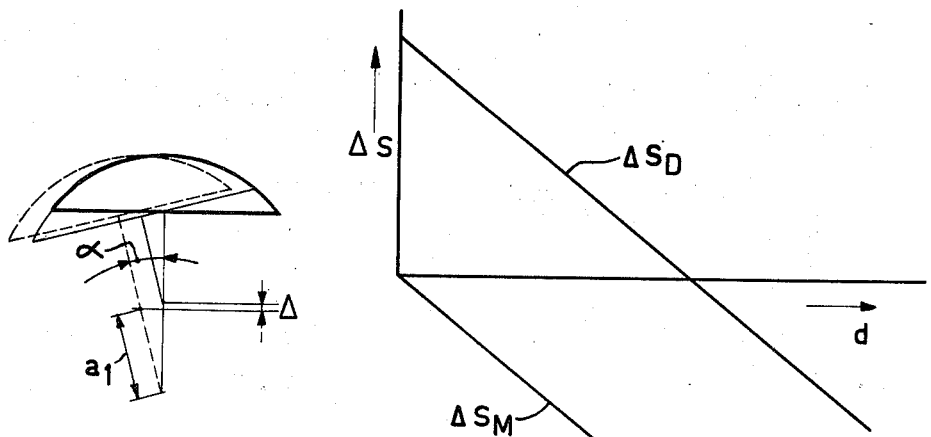

The invention is based on the recognition of the following fact. At d=0, a large play variation $\Delta S$ occurs in the extreme piston positions (dead positions), while in the central piston positions the play variation is zero. At a given value of d, a decrease of the play variation $\Delta S_D$ (the variation of the play for the extreme or dead piston positions) appears to be obtained by the rotation and translation in the extreme positions, while in the central piston positions the play variation $\Delta S_M$ increases to from its zero value for d=0. It has been found that the sum of this increase and decrease is approximately constant (see FIG. 4b, in which $\Delta S_D$ and $\Delta S_M$ are plotted as a function of the distance d.)

The play variations may be small in accordance with the invention when the following choice is made:

$$|\Delta S_D| = |\Delta S_M| = \Delta S'$$

Play deviation in the extreme (dead) piston positions for $$\alpha = \hat{\alpha}, S\hat{\alpha} = \tfrac{1}{2}\Delta S'$$

Play deviation in the piston central positions for $$\alpha = \hat{\alpha}, S\hat{\alpha} = -\tfrac{1}{2}\Delta S'$$

Furthermore:
$$S\check{\alpha} = -\tfrac{1}{2}\Delta S' \text{(in the piston extreme positions)}$$

$$S\check{\alpha} = \tfrac{1}{2}\Delta S' \text{(in the piston central positions)}$$

For a given chosen value of the distance d, the play h in the dead positions (extreme positions of the pistons) can be calculated as follows as a function of the adjustment angle $\alpha$. FIG. 3 shows a part of the plate 1 of FIG. 1 at an increased scale. If the variation h is to be the same in both positions, $2a_1$ must be equal to $a_2 + a_3$.

Then:

$$S_1 = \frac{a_1}{\tan \beta}$$

$$S_3 = S_1 - S_2 = S_1 - (S_1 + R)(1 - \cos\alpha) = (S_1 + R)\cos\alpha - R$$

$$q = \frac{S_3}{\cos \alpha} \text{ or } q = \frac{(\frac{a_1}{\tan \beta} + R)\cos\alpha - R}{\cos \alpha} = \frac{a_1}{\tan \beta} + R - \frac{R}{\cos \alpha}$$

$$\frac{a_2}{\sin \beta} = \frac{q}{\sin(90° - \alpha - \beta)} \quad \frac{a_3}{\sin \beta} = \frac{q}{\sin(90° - \alpha + \beta)}$$

$$a_2 + a_3 = \sin\beta \cdot q \left[ \frac{1}{\cos(\alpha + \beta)} + \frac{1}{\cos(\alpha - \beta)} \right]$$

$$a_2 + a_3 = \sin\beta \left[ \frac{a_1}{\text{tg}\beta} + R - \frac{R}{\cos \alpha} \right] \left[ \frac{1}{\cos(\alpha + \beta)} + \frac{1}{\cos(\alpha - \beta)} \right]$$

$$(a_2 + a_3) - 2a_1 = \sin\beta \left[ \frac{a_1}{\tan \beta} + R - \frac{R}{\cos \alpha} \right] \left[ \frac{1}{\cos(\alpha + \beta)} + \frac{1}{\cos(\alpha - \beta)} \right] - 2a_1$$

$$(a_2 + a_3) - 2a_1 = a_1 \left[ \frac{\sin \beta}{\tan \beta} \cdot \frac{2\cos\alpha \cos\beta}{\cos^2\alpha - \sin^2\beta} - 2 \right] - \frac{\sin \beta}{\cos \alpha}(1 - \cos\alpha)R \frac{2\cos\alpha \cos\beta}{\cos^2\alpha - \sin^2\beta}$$

This results in:

$$(a_2 + a_3) - 2a_1 = 2 \frac{1 - \cos\alpha}{\cos^2\alpha - \sin^2\beta} \left[ a_1(\cos\alpha + \sin^2\beta) - \frac{1}{2} R\sin^2\beta \right] \quad (1)$$

The first term of this formula becomes zero for $\alpha = 0$ and the second term becomes zero if $\alpha$ satisfies $$a_1 = \frac{R}{2} \frac{\sin^2\beta}{\cos\alpha + \sin^2\beta}$$

The play in the dead positions then varies between $\alpha = \check{\alpha}$ and $\alpha = \hat{\alpha}$ for an arbitrary value of $a_1$ as follows:

$$[(a_2 + a_3) - 2a_1]_{\alpha = \hat{\alpha}} - [(a_2 + a_3) - 2a_1]_{\alpha = \check{\alpha}} = (a_2 + a_3)_{\alpha = \hat{\alpha}} - (a_2 + a_3)_{\alpha = \check{\alpha}} =$$

$$2a_1 \left[ \frac{(1 - \cos\hat{\alpha})(\cos\hat{\alpha} + \sin^2\beta)}{\cos^2\hat{\alpha} - \sin^2\beta} - \frac{(1 - \cos\check{\alpha})(\cos\check{\alpha} + \sin^2\beta)}{\cos^2\check{\alpha} - \sin^2\beta} \right] + (-R)\sin^2\beta \left[ \frac{1 - \cos\hat{\alpha}}{\cos^2\hat{\alpha} - \sin^2\beta} - \frac{1 - \cos\check{\alpha}}{\cos^2\check{\alpha} - \sin^2\beta} \right].$$

When the foregoing is elaborated, the play difference for the dead positions is obtained, that is, the play decrease going from $\alpha = \check{\alpha}$ to $\alpha = \hat{\alpha}$ $$(a_2 + a_3)_{\alpha = \hat{\alpha}} - (a_2 + a_3)_{\alpha = \check{\alpha}} = 2a_1 \cos^2\beta \left[ \frac{\cos \hat{\alpha}}{\cos^2\hat{\alpha} - \sin^2\beta} - \right. \quad (2)$$

-continued $$\left. \frac{\cos \check{\alpha}}{\cos^2\check{\alpha} - \sin^2\beta} \right] + (-R)\sin 2\beta \left[ \frac{1 - \cos \hat{\alpha}}{\cos^2\hat{\alpha} - \sin^2\beta} - \frac{1 - \cos \check{\alpha}}{\cos^2\check{\alpha} - \sin^2\beta} \right]$$

The variation of the play in the central positions (of the pistons) between $\alpha = \check{\alpha}$ and $\alpha = \hat{\alpha}$ for an arbitrary value of $a_1$ can be calculated as follows (see FIG. 4):

$$2\Delta = 2\left( \frac{a_1}{\cos \alpha} - a_1 \right) = 2a_1 \left( \frac{1}{\cos \alpha} - 1 \right)$$

Upon adjustment from $\alpha = \check{\alpha}$ to $\alpha = \hat{\alpha}$, the play decrease in the central position amounts to $$2\Delta_{\alpha = \hat{\alpha}} - 2\Delta_{\alpha = \check{\alpha}} = 2a_1 \left( \frac{1}{\cos \hat{\alpha}} - \frac{1}{\cos \check{\alpha}} \right) \quad (3)$$

In accordance with the invention, this play decrease should be equal to the play increase in the dead positions, going from $\alpha = \check{\alpha}$ to $\alpha = \hat{\alpha}$ so equal to (see (2)):

$$(a_2 + a_3)_{\alpha = \hat{\alpha}} - (a_2 + a_3)_{\alpha = \check{\alpha}} =$$

$$= R \sin 2\beta \left[ \frac{1 - \cos \hat{\alpha}}{\cos^2\hat{\alpha} - \sin^2\beta} - \frac{1 - \cos \check{\alpha}}{\cos^2\check{\alpha} - \sin^2\beta} \right]$$

$$- 2a_1 \cos^2\beta \left[ \frac{\cos \hat{\alpha}}{\cos^2\hat{\alpha} - \sin^2\beta} - \frac{\cos \check{\alpha}}{\cos^2\check{\alpha} - \sin^2\beta} \right]$$

This occurs if:

$$a_1 = R2\sin 2\beta \frac{\frac{1 - \cos \hat{\alpha}}{\cos^2\hat{\alpha} - \sin^2\beta} - \frac{1 - \cos \check{\alpha}}{\cos^2\check{\alpha} - \sin^2\beta}}{\left( \frac{1}{\cos\hat{\alpha}} - \frac{1}{\cos\check{\alpha}} \right) + \cos^2\beta \left( \frac{\cos \hat{\alpha}}{\cos^2\hat{\alpha} - \sin^2\beta} - \frac{\cos \check{\alpha}}{\cos^2\check{\alpha} - \sin^2\beta} \right)}$$

or in a suitable approximation $$a_1 = \frac{R}{2} \sin 2\beta \frac{\frac{1-\cos\hat{\alpha}}{\cos^2\hat{\alpha}} - \frac{1-\cos\check{\alpha}}{\cos^2\check{\alpha}}}{2(\frac{1}{\cos\hat{\alpha}} - \frac{1}{\cos\check{\alpha}})}$$

This results in:

$$a_1 = \frac{R}{2} \cdot \sin 2\beta \cdot \frac{1}{2} \cdot \left[\frac{1}{\cos\hat{\alpha}} + \frac{1}{\cos\check{\alpha}} - 1\right]$$

The distance d between the parallel planes 40 and 41 (see FIG. 1) equals 2a. Thus, if $$d = \frac{R}{2} \cdot \sin 2\beta \left[\frac{1}{\cos\hat{\alpha}} + \frac{1}{\cos\check{\alpha}} - 1\right] \quad (4)$$

the play increase in the dead positions and the play decrease in the central positions will be equal and within acceptable narrow limits.

Because the variation of the play h for an arbitrary shaft angle wt must be symmetrical in $\alpha$, h can be written approximately as $h = a + b\alpha^2$.

The extreme positions occur at wt=0, $\pi$, $2\pi$, ... and the central positions occur at wt=$\pi/2$, $3\pi/2$, $5\pi/2$, ... Applied to a construction of the plate 1 in which for a distance d the same play variation occurs in the central positions as in the extreme positions (see (4)), we find $$h = \bar{h} - \frac{\Delta h}{2} + \Delta h \frac{\alpha^2 - \check{\alpha}^2}{\hat{\alpha}^2 - \check{\alpha}^2}$$

wt = 0

$$h = \bar{h} + \frac{\Delta h}{2} - \Delta h \frac{\alpha^2 - \check{\alpha}^2}{\hat{\alpha}^2 - \check{\alpha}^2}$$

wt = $\frac{\pi}{2}$ in which $\Delta h$ corresponds to $\Delta S'$, referred to earlier. It also appears that h becomes $\bar{h}$, that is, constant, if $$\alpha = \sqrt{(\hat{\alpha}^2 + \check{\alpha}^2)/2}.$$

If $\check{\alpha}=0$ and $\hat{\alpha}=22$, a constant play is obtained at $$\alpha = (22/\sqrt{2}) = 15.6°.$$

The plate 1 can then be constructed as for a fixed angle $\alpha = 15.6°$ (the planes 40 and 41 then enclose an angle of 15.6° with the horizontal) and the distance d is in this case chosen to be equal to the value of the formula (4).

Figure 5:
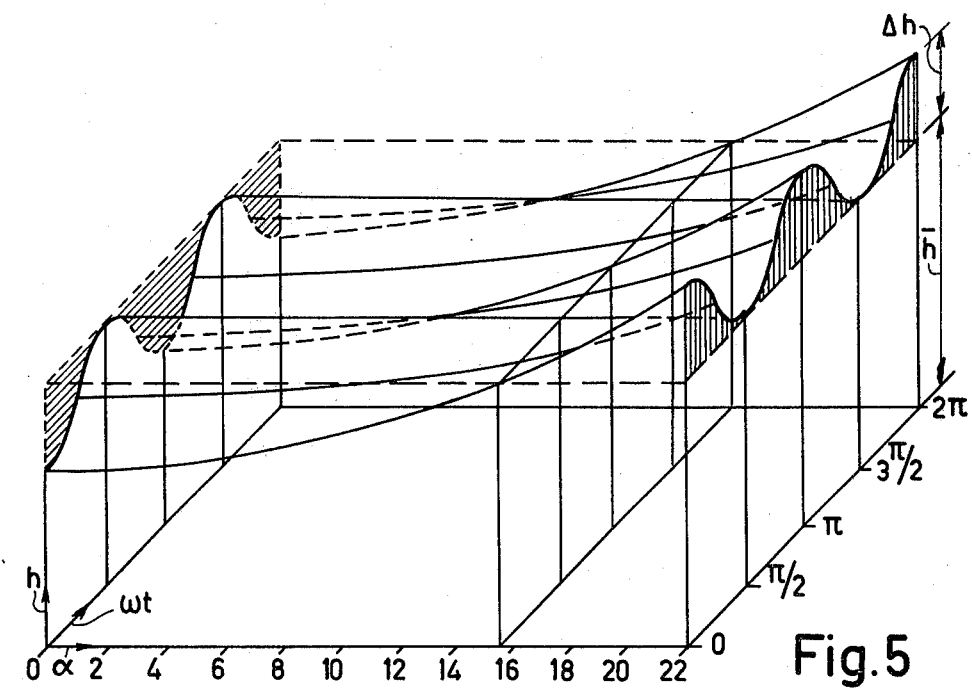
Figure 6:
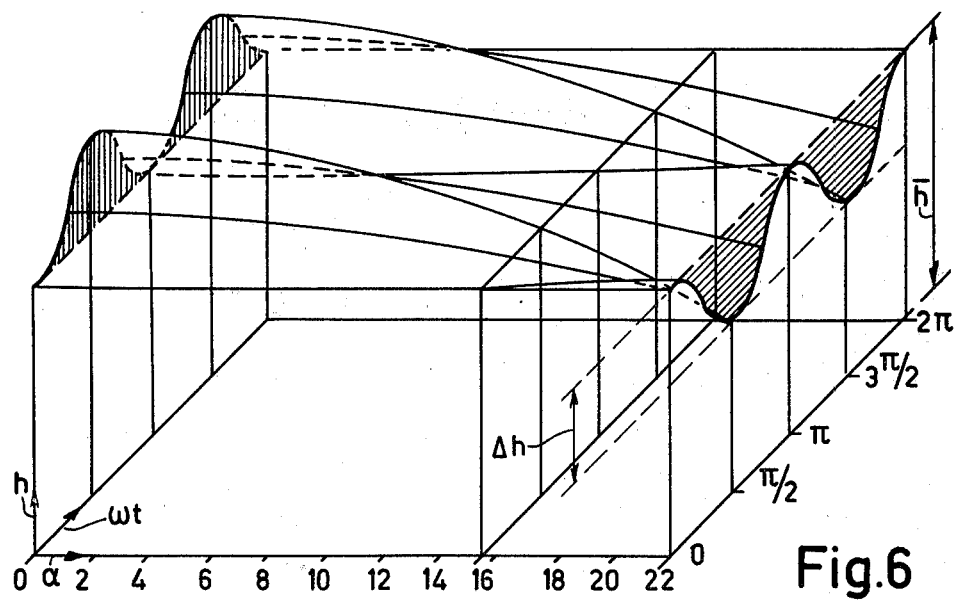
Figure 7:
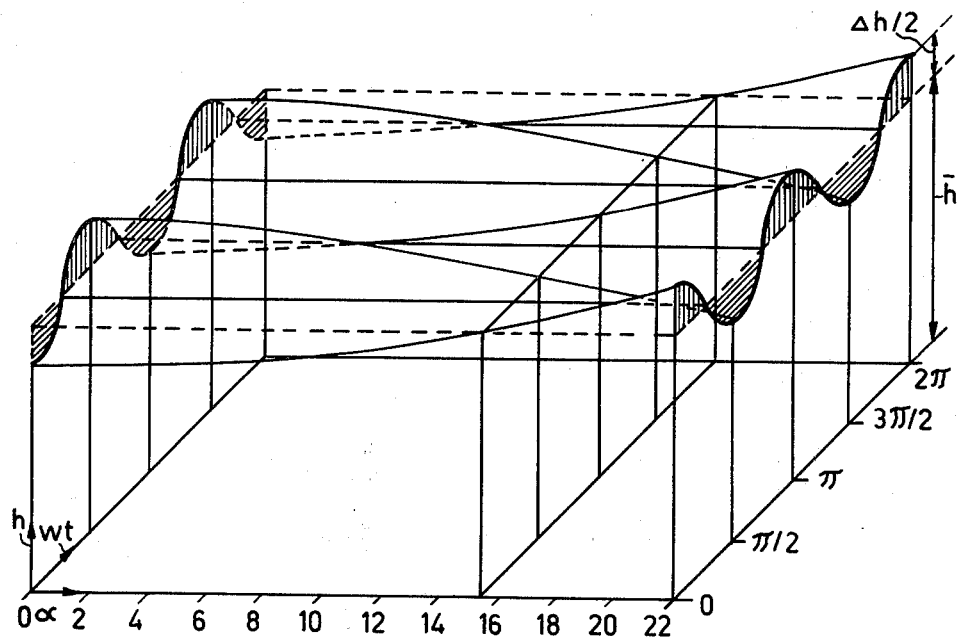

FIGS. 5 to 7 diagrammatically show the variation of the play for a double-conical plate which can be adjusted from $\check{\alpha}=0$ to $\hat{\alpha}=22$.

In the case of a distance d=0 between the centers of curvature, which means $a_1=0$, the play in the dead positions increases, going from $\alpha=0$ to $\alpha=\hat{\alpha}$, as $$2 \frac{1-\cos\hat{\alpha}}{\cos^2\hat{\alpha} - \sin^2\beta} \cdot \frac{1}{2} R \sin 2\beta \text{ (see (1))}.$$

This is approximately equal to R sin $2\beta(1-\cos\hat{\alpha}/\cos^2\hat{\alpha})$. The play in the central positions for $d=a_1=0$ then remains constant (see (3)).

If $a_1 = \frac{1}{2}R$ (sin $2\beta/\cos\hat{\alpha} + \sin^2\beta$), the play in the dead positions remains constant (see (1)) and the play in the central positions decreases (see (3)) by $$2 = 2a_1 \left(\frac{1-\cos\hat{\alpha}}{\cos\hat{\alpha}}\right) = R \sin 2\beta \frac{1-\cos\hat{\alpha}}{\cos^2\hat{\alpha} + \sin^2\beta \cos\hat{\alpha}}$$

This is also approximately equal to R sin $2\beta(1-\cos\hat{\alpha}/\cos^2\hat{\alpha})$. Thus, in both cases equally large but opposed play variations occur. When half the value is chosen for a, it has been found that the value of the variations ocurring is reduced to one half, i.e., in the dead positions as well as in the central positions a play variation then occurs whose magnitude has been reduced to one half and which are oppositely directed.

FIG. 5 shows the situation for a distance d=0 between the planes 40 and 41. The play variations in the dead positions, i.e., wt=0, $\pi$, $2\pi$, then amount to $\pm\Delta h$, while they are zero in the central positions.

FIG. 6 illustrates the situation for a distance d=R (sin $2\beta/\cos\alpha$). The play variations are now zero in the dead positions (wt=0, $\pi$, $2\pi$, ... ) and $\pm\Delta h$ in the central positions (wt=$\pi/2$, $3\pi/2$, ... ).

Finally, FIG. 7 shows the situation for a distance $$d = \frac{R}{2} \frac{\sin 2\beta}{\cos\hat{\alpha}}.$$

The play variations are then $\pm\frac{1}{2}\Delta$ h in the dead as well as in the central positions.

Figure 8:
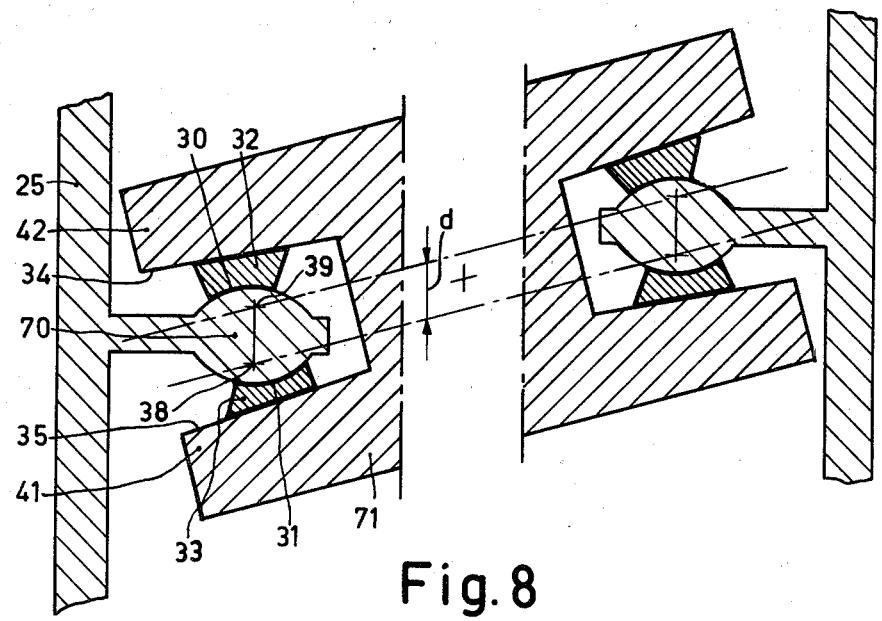
FIG. 8 is a diagrammatic cross-sectional view (not to scale) of another swashplate drive embodiment in which the sliding bodies are accommodated in a groove in a side of the plate.

FIG. 8 shows how the invention can also be applied for a drive in which the sliding bodies do not slide on the outer sides of the plate but are accommodated in a groove in the side of the plate. The distance d between the planes 40 and 41 should again satisfy the formula (4). The reference numerals used correspond to those of FIG. 1.

What is claimed is:

1. A swashplate drive having a shaft rotatably journalled in a frame; a plate mounted on the shaft for rotation therewith and having running surfaces formed by a set of straight lines, each straight line extending substantially in a radial plane through the axis of the shaft and tangent at the respective running surface to a respective torus, central lines of the two tori being formed by two ellipses spaced axially from each other in parallel planes; means for mounting the plate to the shaft for rotation therewith, and for tilting the plate to a selected angle $\alpha$ about an axis transverse to the shaft axis; and means for coupling at least one drive rod to the plate, said means including a drive rod head having two spherical surfaces, the centers of the spherical surfaces lying on respective torus central lines, and two sliding bodies having spherical surfaces for contacting the respective spherical surfaces of the head and flat sides for engaging said running surfaces, wherein said running surfaces are arranged so that the variation of axial play between the plate, sliding bodies and drive rod head is minimized for all tilting positions of the plate between a minimum tilt angle $\check{\alpha}$ and a maximum tilt angle $\hat{\alpha}$ enclosed by the plate and a plane perpendicular to the shaft, and for all rotational positions of the shaft, said centers of the drive rod head spherical surfaces being separated by a distance d selected to provide a variation in play as a function of shaft rotational position, at the minimum plate tilt angle, which is opposite to the variation in play as a function of the shaft rotational position at the maximum plate tilt angle.

2. A drive as claimed in claim 1 wherein, at a tilt angle $$\alpha = \sqrt{(\hat{\alpha}^2 + \check{\alpha}^2)/2}$$

the ellipses are formed by the lines of intersection of the respective parallel planes and a circular cylinder around the center line of the shaft extending through the centers of curvature of the drive rod heads.

3. A drive as claimed in claim 2 wherein the distance d between the centers of curvature of the drive rod head spherical surfaces satisfies the equation $$d = \frac{R}{2} \sin 2\beta \left( \frac{1}{\cos \hat{\alpha}} + \frac{1}{\cos \check{\alpha}} - 1 \right),$$

in which
- R = the distance between the centers of curvature of the spherical surfaces and the center line of the shaft; and
- $\beta$ = the angle enclosed by the straight lines, forming the running surfaces, and the central plane of the plates.

4. A swashplate drive having a shaft rotatably journalled in a frame; a plate mounted on the shaft for rotation therewith and having opposed conical running surfaces having their respective vertices substantially on the shaft axis and being tangent at the respective running surface to a respective torus, central lines of the two tori being formed by two ellipses spaced axially from each other in parallel planes; means for mounting the plate to the shaft for rotation therewith, and for tilting the plate about an axis transverse to the shaft axis; and means for coupling at least one drive rod to the plate, said means including a drive rod head having two spherical surfaces, and two sliding bodies having spherical surfaces for contacting the respective spherical surfaces of the head and flat sides for engaging said running surfaces, wherein said running surfaces are arranged so that at a tilt angle $\alpha = \sqrt{\hat{\alpha}^2 + \check{\alpha}^2}/2$ being a minimum tilt angle and $\hat{\alpha}$ being a maximum tilt angle enclosed by the plate and a plane perpendicular to the shaft, the ellipses are formed by the lines of intersection of the respective parallel planes and a circular cylinder around the center line of the shaft extending through the centers of curvature of the drive rod heads, and the distance d between the centers of curvature of the drive rod heads spherical surfaces satisfies the equation $$d = \frac{R}{2} \sin 2\beta \left( \frac{1}{\cos \hat{\alpha}} + \frac{1}{\cos \check{\alpha}} - 1 \right),$$

in which
- R = the distance between the centers of curvature of the curvature of the spherical surfaces and the center line of the shaft;
- $\beta$ = the angle enclosed by the straight lines, forming the running surfaces, and the central plane of the plates;
- whereby axial play between the plate, sliding bodies and drive rod heads is substantially constant for the tilt angle $\alpha = \sqrt{\hat{\alpha}^2 + \check{\alpha}^2}/2$, and the axial play is minimized for all tilting angles of the shaft between the minimum tilt angle $\check{\alpha}$ and the maximum tilt angle $\hat{\alpha}$, for all rotational positions of the shaft.

* * * * *